(12) United States Patent
Lu et al.

(10) Patent No.: US 10,817,694 B2
(45) Date of Patent: Oct. 27, 2020

(54) REDUCING BACKGROUND SIGNAL IN IMAGING SENSORS

(71) Applicant: QUALCOMM Incorporated, San Diego, CA (US)

(72) Inventors: Yipeng Lu, Davis, CA (US); Jessica Liu Strohmann, Cupertino, CA (US); Hrishikesh Vijaykumar Panchawagh, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/362,185

(22) Filed: Mar. 22, 2019

(65) Prior Publication Data

US 2020/0302140 A1    Sep. 24, 2020

(51) Int. Cl.
*G06K 9/00* (2006.01)

(52) U.S. Cl.
CPC ......... *G06K 9/0002* (2013.01); *G06K 9/0008* (2013.01)

(58) Field of Classification Search
CPC ........................... G06K 9/0002; G06K 9/0008
See application file for complete search history.

(56) References Cited

U.S. PATENT DOCUMENTS

| 10,001,552 | B2 | 6/2018 | Panchawagh et al. |
| 2015/0016223 | A1* | 1/2015 | Dickinson ................ G01H 1/04 367/87 |
| 2016/0107194 | A1* | 4/2016 | Panchawagh ......... B06B 1/0607 367/140 |
| 2017/0090028 | A1* | 3/2017 | Djordjev ................. G01S 7/521 |
| 2017/0110504 | A1* | 4/2017 | Panchawagh ......... B06B 1/0207 |
| 2017/0231534 | A1* | 8/2017 | Agassy ................ G06K 9/0002 382/124 |
| 2018/0031686 | A1* | 2/2018 | Kuo ...................... G06K 9/0002 |

\* cited by examiner

*Primary Examiner* — Premal R Patel
(74) *Attorney, Agent, or Firm* — Holland & Hart LLP

(57) ABSTRACT

The descried techniques may support a sensing scheme for reducing background signals in imaging sensors. A device may include a sensor configured to determine ridges and valleys of a fingerprint. The sensor may include a pixel array with each pixel of the pixel array having a set of electrodes. To reduce the background signals, the device may sense, e.g., during a transmit mode, a first set of signals associated with the pixel array using at least one electrode of the set of electrodes, and sense, e.g., during a receive mode, a second set of signals associated with the pixel array using the at least one electrode. The device may reduce a background signal associated with the sensor according to the sensing of the first set of signals and the second set of signals.

18 Claims, 7 Drawing Sheets

REDUCING BACKGROUND SIGNAL IN IMAGING SENSORS

BACKGROUND

Some examples of a device, such as a smartphone may support biometric authentication schemes for user access. In the context of a fingerprint imager, an ultrasonic wave may propagate through a surface of the smartphone on which a person's finger may be placed to obtain a fingerprint image. After passing through the surface, some portions of the wave may encounter skin that is in contact with the surface (e.g., fingerprint ridges), while other portions of the ultrasonic wave encounter air (e.g., valleys between adjacent ridges of a fingerprint) and may be reflected with different intensities back towards the ultrasonic fingerprint imager. The reflected signals associated with the finger may be processed and converted to a digital value representing the signal strength of the reflected signal. When multiple reflected signals are collected over a distributed area, the digital values of such signals may be used to produce a graphical representation of the signal strength over the distributed area (e.g., by converting the digital values to an image), thereby producing an image of the fingerprint.

SUMMARY

Some examples of imaging sensors, such as ultrasonic imaging sensors are deployed in electronic devices, and more specifically various applications, such as fingerprint recognition. In fingerprint recognition applications, an ultrasonic imaging sensor having an array of transducer components may determine ridges and valleys of a fingerprint by capturing signals (in response to the time-varying excitation voltage) and determining the differences in signal amplitudes between the ridges and valleys (e.g., a delta signal). In some examples, a background signal may provide interference to the delta signal causing less accurate measurements. New techniques for reducing background signals may be desired.

The described techniques relate to improved methods, systems, devices, and apparatuses that support components, such as piezoelectric micromechanical ultrasonic transducers (PMUTs), and more specifically reducing background signals in ultrasonic imaging sensors configurable with (or configured with) PMUTs to determine ridges and valleys of a fingerprint according to an improved sensing scheme. In some examples, the component, which may be a PMUT may be a 3-port PMUT that may reduce background signals in ultrasonic imaging sensors (e.g., due to opposite poling as a result of edge-clamped bending deflection). That is, a set of electrodes disposed above a piezoelectric layer of the 3-port PMUT, as one example, may exhibit opposite signs of voltage caused by a same direction of deflection, which may reduce background signals and sustain an intensity of a delta signal. Thus, described techniques relate to improved methods, systems, devices, and apparatuses that may reduce background signals without uni-poling electrodes.

A method for reducing background signals at a device comprising an ultrasonic imaging sensor configured to determine ridges and valleys of a fingerprint, the ultrasonic imaging sensor comprising a pixel array with each pixel of the pixel array comprising a set of electrodes having at least three electrodes. The method may include sensing, during a transmit mode, a first set of signals associated with one or more pixels of the pixel array using at least one electrode of the set of electrodes, sensing, during a receive mode, a second set of signals associated with the one or more pixels of the pixel array using the at least one electrode, and reducing a background signal associated with the ultrasonic imaging sensor based at least in part on the sensing of the first set of signals and the second set of signals.

An apparatus for reducing background signals is described. The apparatus may include a processor, memory in electronic communication with the processor, an ultrasonic imaging sensor coupled with the processor and the memory and configured to determine ridges and valleys of a fingerprint, the ultrasonic imaging sensor comprising a pixel array with each pixel of the pixel array comprising a set of electrodes having at least three electrodes, and instructions stored in the memory. The instructions may be executable by the processor to cause the apparatus to sense, during a transmit mode, a first set of signals associated with one or more pixels of the pixel array using at least one electrode of the set of electrodes, sense, during a receive mode, a second set of signals associated with the one or more pixels of the pixel array using the at least one electrode, and reduce a background signal associated with the ultrasonic imaging sensor based at least in part on the sensing of the first set of signals and the second set of signals.

Another apparatus for reducing background signals is described. The apparatus may include means for sensing, during a transmit mode, a first set of signals associated with one or more pixels of the pixel array using at least one electrode of the set of electrodes, means for sensing, during a receive mode, a second set of signals associated with the one or more pixels of the pixel array using the at least one electrode, and means for reducing a background signal associated with the ultrasonic imaging sensor based at least in part on the sensing of the first set of signals and the second set of signals.

A non-transitory computer-readable medium storing code for reducing background signals is described. The code may include instructions executable by a processor to sense, during a transmit mode, a first set of signals associated with one or more pixels of a pixel array using at least one electrode of a set of electrodes, sense, during a receive mode, a second set of signals associated with the one or more pixels of the pixel array using the at least one electrode, and reduce a background signal associated with an ultrasonic imaging sensor based at least in part on the sensing of the first set of signals and the second set of signals.

Some examples of the method, apparatuses, and non-transitory computer-readable medium described herein may further include operations, features, means, or instructions for determining a difference in amplitudes between the ridges and the valleys associated with the fingerprint based at least in part on the first set of signals and the second set of signals, and outputting a representation of the fingerprint using an image processing technique on the first set of signals and the second set of signals.

Some examples of the method, apparatuses, and non-transitory computer-readable medium described herein for sensing, during the transmit mode, the first set of signals associated with the one or more pixels of the pixel array, may further include operations, features, means, or instructions for grounding at least two electrodes of the set of electrodes associated with the one or more pixels of the pixel array during the transmit mode.

In some examples of the method, apparatuses, and non-transitory computer-readable medium described herein, the at least two electrodes of the set of electrodes are in contact with an upper surface of a piezoelectric layer of a piezoelectric micromechanical ultrasonic transducer and the piezoelectric layer is uni-poled, the ultrasonic imaging sensor comprising the piezoelectric micromechanical ultrasonic transducer.

Some examples of the method, apparatuses, and non-transitory computer-readable medium described herein may further include operations, features, means, or instructions for coupling the at least one electrode of the set of electrodes with a sense amplifier based at least in part on activating a switch component coupled with the at least one electrode and the sense amplifier.

Some examples of the method, apparatuses, and non-transitory computer-readable medium described herein for sensing, during the transmit mode, the first set of signals associated with the one or more pixels of the pixel array, may further include operations, features, means, or instructions for sensing a voltage signal or a current signal of the at least one electrode of the set of electrodes via a sense amplifier, wherein the first set of signals associated with the one or more pixels of the pixel array comprises the voltage signal or the current signal of the at least one electrode.

Some examples of the method, apparatuses, and non-transitory computer-readable medium described herein may further include operations, features, means, or instructions for shorting the at least one electrode by clamping the voltage signal or the current signal of the at least one electrode to ground during the receive mode.

Some examples of the method, apparatuses, and non-transitory computer-readable medium described herein may further include operations, features, means, or instructions for decoupling the at least one electrode of the set of electrodes from the sense amplifier based at least in part on activating a switch component coupled with the at least one electrode and the sense amplifier during the receive mode.

In some examples of the method, apparatuses, and non-transitory computer-readable medium described herein, the at least one electrode is in contact with a lower surface of a piezoelectric layer of a piezoelectric micromechanical ultrasonic transducer and the piezoelectric layer is uni-poled, the ultrasonic imaging sensor comprising the piezoelectric micromechanical ultrasonic transducer.

Some examples of the method, apparatuses, and non-transitory computer-readable medium described herein may further include operations, features, means, or instructions for grounding a first electrode of the set of electrodes during the receive mode.

Some examples of the method, apparatuses, and non-transitory computer-readable medium described herein for sensing, during the receive mode, the second set of signals associated with the one or more pixels of the pixel array, may further include operations, features, means, or instructions for floating a second electrode of the set of electrodes during the receive mode by decoupling the second electrode from a sense amplifier based at least in part on toggling a switch component positioned between the second electrode and the sense amplifier during the receive mode.

In some examples of the method, apparatuses, and non-transitory computer-readable medium described herein, the first electrode is in contact with an upper surface of a piezoelectric layer of a piezoelectric micromechanical ultrasonic transducer, and the second electrode is in contact with a lower surface of the piezoelectric layer of the piezoelectric micromechanical ultrasonic transducer, the ultrasonic imaging sensor comprising the piezoelectric micromechanical ultrasonic transducer.

Some examples of the method, apparatuses, and non-transitory computer-readable medium described herein may further include operations, features, means, or instructions for coupling a third electrode of the set of electrodes with a second sense amplifier based at least in part on activating a second switch component coupled with the third electrode and the second sense amplifier.

In some examples of the method, apparatuses, and non-transitory computer-readable medium described herein, the at least one electrode comprises the third electrode.

Some examples of the method, apparatuses, and non-transitory computer-readable medium described herein for sensing, during the receive mode, the second set of signals associated with the one or more pixels of the pixel array may further include operations, features, means, or instructions for sensing a voltage signal or a current signal of the third electrode associated with the one or more pixels of the pixel array via the second sense amplifier.

In some examples of the method, apparatuses, and non-transitory computer-readable medium described herein, the second set of signals associated with the one or more pixels of the pixel array comprises the voltage signal or the current signal of the third electrode associated with the one or more pixels of the pixel array.

In some examples of the method, apparatuses, and non-transitory computer-readable medium described herein, a first electrode of the set of electrodes associated with the one or more pixels of the pixel array is grounded during the transmit mode and the receive mode.

DETAILED DESCRIPTION

Figure 1:
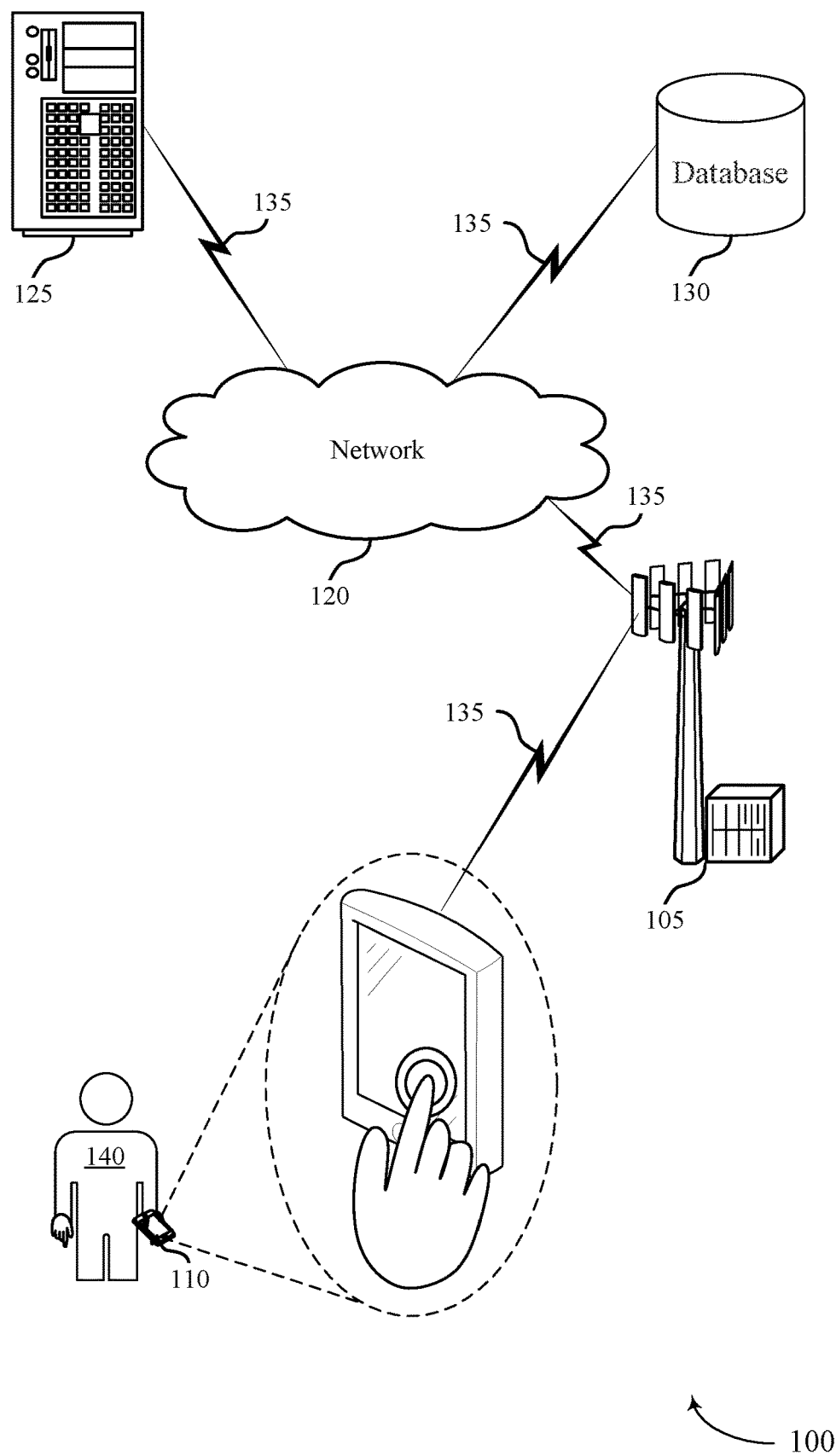
FIG. 1 illustrates an example of a system that supports reducing background signal in imaging sensors in accordance with aspects of the present disclosure.

Authentication data (e.g., such as usernames, passwords, biometric traits, etc.) is being increasingly used to control access to resources (e.g., such as computer and email accounts, mobile device access, etc.) and to prevent unauthorized access to important information or data stored in such accounts or electronic devices. Biometric authentication techniques may provide for robust security due to, for example, the inherent universality, uniqueness, and permanence of certain biometric traits. For example, an electronic device (e.g., computer, mobile device, etc.) may utilize biometric authentication techniques for user access. In the context of an ultrasonic fingerprint imager, as an example, an ultrasonic wave may travel through a surface on which a person's finger may be placed to obtain a fingerprint image. After passing through the surface, some portions of the ultrasonic wave encounter skin that is in contact with the surface (e.g., fingerprint ridges), while other portions of the ultrasonic wave encounter air (e.g., valleys between adjacent ridges of a fingerprint) and may be reflected with different intensities back towards the ultrasonic sensor.

The reflected signals associated with the finger may be processed and converted to a digital value representing the signal strength of the reflected signal. When multiple reflected signals are collected over a distributed area, the digital values of such signals may be used to produce a graphical representation of the signal strength over the distributed area (e.g., by converting the digital values to an image), thereby producing an image of the fingerprint. Thus, an ultrasonic sensor system may be used as a fingerprint sensor or other type of biometric sensor (e.g., in some implementations, the detected signal strength may be mapped into a contour map of the finger that is representative of the depth of the ridge structure detail).

Some examples of ultrasonic imaging sensors may contain thin film piezoelectric acoustic transducers, such transducers may include piezoelectric micromechanical ultrasonic transducers (PMUTs). PMUTs are widely deployed in electronic devices, and more specifically in ultrasonic sensors for various applications, such as fingerprint recognition. Typically, these transducers may include one or more piezoelectric layers (including one or more transmit or receive electrodes disposed, respectively, below and above the piezoelectric layers) and a mechanical layer, which may be caused to vibrate in response to a time-varying excitation voltage applied. In fingerprint recognition applications, an ultrasonic imaging sensor having an array of these transducer components may determine ridges and valleys of a fingerprint by capturing signals (in response to the time-varying excitation voltage) and determining the differences in signal amplitudes between the ridges and valleys (e.g., a delta signal).

In some examples, a background signal may provide interference to the delta signal causing less accurate measurements. Some other techniques may attempt to address challenges of the background signal, but these techniques result in a small delta signal superimposed on a large background signal, which may cause noise and limit gain due to saturation issues. Other techniques may use double piezoelectric layers (e.g., uni-poled) with opposite poling, but these techniques have undesirable fabrication requirements. Ultrasonic imaging sensors capable of reducing background signals may be desired.

The described techniques relate to improved methods, systems, devices, and apparatuses that support ultrasonic transducers (e.g., PMUTs), and more specifically reducing background signals in imaging sensors configurable (or configured with) ultrasonic transducers to determine ridges and valleys of a fingerprint according to an improved sensing scheme. The improved sensing scheme may include sensing, during a transmit mode, a first set of signals associated with one or more pixels of a pixel array using at least one electrode of a set of electrodes of an ultrasonic imaging sensor, sensing, during a receive mode, a second set of signals associated with the one or more pixels of the pixel array using the at least one electrode, and reducing a background signal associated with the ultrasonic imaging sensor based in part on the sensing of the first set of signals and the second set of signals.

Aspects of the disclosure are initially described in the context of a system for ultrasonic imaging sensors. Example sensor architecture and example sensor configurations are then described. Aspects of the disclosure are further illustrated by and described with reference to apparatus diagrams, system diagrams, and flowcharts that relate to reducing background signal in ultrasonic imaging sensors.

FIG. 1 illustrates an example of a system 100 that supports reducing background signal in imaging sensors in accordance with aspects of the present disclosure. In some examples, the system 100 may be a wireless communications system that may be a multiple-access wireless communications system, for example, such as a fourth generation (4G) systems such as Long Term Evolution (LTE) systems, LTE-Advanced (LTE-A) systems, or LTE-A Pro systems, and fifth generation (5G) systems which may be referred to as New Radio (NR) systems, as well as wireless local area networks (WLAN), such as Wi-Fi (i.e., Institute of Electrical and Electronics Engineers (IEEE) 802.11) and Bluetooth-related technology. The system 100 may include a base station 105, a device 110, a server 125, and a database 130. In some examples, the system 100 may also include a user 140, where the device 110 may employ sensing techniques. For example, device 110 may employ biometric sensing techniques (e.g., ultrasonic imaging processing) for user 140 to sense and image a fingerprint of the user 140. The aspects of the system 100 are for exemplary purposes only, and are not intended to be limiting in terms of the applicability of the described techniques. That is, the techniques described herein may be implemented in, or applicable to, other examples of biometric scanning, without departing from the scope of the present disclosure. For example, the described ultrasonic imaging sensor and associated biometric sensing techniques may be applied for scanning of other biometric traits (e.g., such as an eyeball or retina, a face, etc.).

The device 110 may be referred to as a mobile device, a wireless device, a remote device, a handheld device, a subscriber device, an authentication device, a biometric sensing device, a scanning device, or some other suitable terminology. A device 110 may also be a personal electronic device such as a cellular phone, a personal digital assistant (PDA), a tablet computer, a laptop computer, a personal computer, a display device (e.g., any device with a display or screen), etc. In some examples, the device 110 may also be referred to as an Internet of Things (IoT) device, an Internet of Everything (IoE) device, a machine type communication (MTC) device, a peer-to-peer (P2P) device, or the like, which may be implemented in various articles such as appliances, vehicles, meters, or the like. Further examples of device 110 that may implement one or more aspects of ultrasonic biometric sensors and associated techniques may include Bluetooth devices, personal data assistants (PDAs), wireless electronic mail receivers, hand-held or portable computers, netbooks, notebooks, printers, copiers, scanners, cash machines, facsimile devices, GPS receivers/navigators, cameras, game consoles, wrist watches, clocks, calculators, television monitors, flat panel displays, electronic reading devices (e.g., e-readers), computer monitors, auto displays (including odometer and speedometer displays, etc.), cockpit controls and/or displays, camera view displays (such as the display of a rear view camera in a vehicle), electronic photographs, electronic billboards or signs, and projectors, and the like.

Any of such device 110 may include a sensor, for example, an ultrasonic imaging sensor (also referred to herein as an ultrasonic biometric sensor, or simply an ultrasonic sensor) configurable (or configured with) piezoelectric micromechanical ultrasonic transducers (PMUTs).

The ultrasonic imaging sensor may be configured to determine ridges and valleys of a fingerprint of the user 140. In some examples, the PMUT may be a 3-port PMUT, which may achieve reducing background signals in the ultrasonic imaging sensor. In some examples, the PMUT may include a layer of piezo-sensitive material (e.g., such as a continuous copolymer) between an electrode array and a common electrode (e.g., a reference electrode). The electrode array may include several electrodes that may each be associated (e.g., connected to) a transceiver circuit (e.g. a transmit circuit and a receive circuit), and each electrode in the electrode array may perform aspects of biometric sensing and imaging (e.g., to sense and image a fingerprint). In some examples, the sensor may be attached to or mounted on a frame of the device 110 near or under a cover surface of the device's 110 display (e.g., an organic light emitting diode (OLED) display, plastic OLED (pOLED) display, etc.). Further, the device 110 may include electrical connections associated with the sensor.

For example, the device 110 may include an array of pixel circuits disposed on a substrate (e.g., which may be referred to as a backplane). In some examples, each pixel circuit may include one or more thin-film transistor components, electrical interconnect traces and, in some examples, one or more additional circuit components such as diodes, capacitors, and the like. Each pixel circuit may include a pixel input electrode (e.g., that electrically couples the piezoelectric layer to the pixel circuit). The continuous copolymer (e.g., layer of piezo-sensitive material) may provide for a thin layer, between the common electrode and the electrode array, with desirable material properties to isolate each pixel from neighboring pixels and enable effective ultrasonic signal sensing. Each transceiver circuit associated with an electrode of the electrode array may be driven, such that a voltage may be applied to contract and expand different portions of the continuous piezoelectric layer to convert electrical energy into mechanical energy (e.g., into an ultrasonic signal). As such, the sensor (e.g., the ultrasonic sensor) of the device 110 may transmit an ultrasonic signal focused on a portion of a finger of the user 140, based in part on driving the electrode array.

The ultrasonic signal may interact with a finger of the user 140, such that a reflected signal may then be measured by the sensor of the device 110. Some portions of the ultrasonic wave meet skin that is in contact with the surface (e.g., fingerprint ridges), while other portions of the ultrasonic wave encounter air (e.g., valleys between adjacent ridges of a fingerprint), and may be reflected with different intensities back towards the sensor. Each pixel circuit may be configured to convert an electric charge generated in the piezoelectric receiver layer (e.g., from the reflected ultrasonic signal) proximate to the pixel circuit into an electrical signal. For example, localized charges may be collected by the pixel input electrodes and passed on to the underlying pixel circuits. The charges may then be amplified by the pixel circuits and provided to the control electronics, which processes the output signals. Reflected signals associated with the fingerprint of the user 140 may thus be processed by the device 110 and converted to a digital value representing the signal strength of the reflected signal. When multiple such reflected signals are collected over a distributed area, the digital values of such signals may be used to produce a graphical representation of the signal strength over the distributed area. For example, the device 110 may convert the digital values to an image, thereby producing an image of the finger of the user 140. In some examples, the device 110 may further compare the produced image to a stored image (e.g. stored in database 130) for authentication decisions.

For example, each pixel of a pixel array may be associated with a local region of the piezo-sensitive layer, and may include or be associated with a peak detection diode and a readout transistor (e.g., these components may be formed on or in the backplane to form the pixel circuit). The local region of piezoelectric sensor material of each pixel may transduce received ultrasonic energy into electrical charges. The peak detection diode may register the maximum amount of charge detected by the local region of piezoelectric sensor material. Each row of the pixel array may then be scanned (e.g., through a row select mechanism, a gate driver, or a shift register) and the readout transistor for each column may be triggered to allow the magnitude of the peak charge for each pixel to be read by additional circuitry (e.g., a multiplexer, an analog to digital converter, etc.). The pixel circuit may include one or more thin-film transistors to allow gating, addressing, and resetting of the pixel. Each pixel circuit may provide information about a small portion of the finger detected by the sensor of the device 110. In some examples, the detection area of the sensor of the device 110 may be selected. For example, the detection area may range from about 5 mm×5 mm for a single finger to about 3 inches×3 inches for four fingers. Smaller and larger areas, including square, rectangular and non-rectangular geometries, may be used as appropriate biometric sensing and imaging.

The server 125 may be a computing system or an application that may be an intermediary node in the system 100 between the device 110 or the database 130. The server 125 may include any combination of a data server, a cloud server, a server associated with an authentication service provider, proxy server, mail server, web server, application server (e.g., authentication application server), database server, communications server, home server, mobile server, or any combination thereof. The server 125 may also transmit to the device 110 a variety of authentication information, such as biometric information, configuration information, control instructions, and other information, instructions, or commands relevant to performing a biometric sensing operation (e.g., to sense and image a fingerprint of the user 140).

The database 130 may store data that may include biometric information for an authentication environment, or commands relevant to reducing background signals for the device 110 when performing a biometric sensing operation (e.g., to sense and image a fingerprint of the user 140). The device 110 may retrieve the stored data from the database via the network 120 using communication links 135. In some examples, the database 130 may be a relational database (e.g., a relational database management system (RDBMS) or a Structured Query Language (SQL) database), a non-relational database, a network database, an object-oriented database, among others that stores the variety of biometric information, such as instructions or commands relevant to sensing biometric information.

The network 120 that may provide encryption, access authorization, tracking, Internet Protocol (IP) connectivity, and other access, computation, modification, and/or functions. Examples of network 120 may include any combination of cloud networks, local area networks (LAN), wide area networks (WAN), virtual private networks (VPN), wireless networks (using 802.11, for example), cellular networks (using 3G, 4G, LTE, or NR systems (e.g., 5G for example), etc. Network 120 may include the Internet.

The base station 105 may wirelessly communicate with the device 110 via one or more base station antennas. Base station 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. The device 110 described herein may be able to communicate with various types of base stations and network equipment including macro eNBs, small cell eNBs, gNBs, relay base stations, and the like.

The communication links 135 shown in the system 100 may include uplink transmissions from the device 110 to the base station 105, or the server 125, and/or downlink transmissions, from the base station 105 or the server 125 to the device 110. The downlink transmissions may also be called forward link transmissions while the uplink transmissions may also be called reverse link transmissions. The communication links 135 may transmit bidirectional communications and/or unidirectional communications. The communication links 135 may include one or more connections, including but not limited to, 345 MHz, Wi-Fi, Bluetooth, Bluetooth low-energy (BLE), cellular, Z-WAVE, 802.11, peer-to-peer, LAN, wireless local area network (WLAN), Ethernet, FireWire, fiber optic, and/or other connection types related to system 100.

Figure 2A:
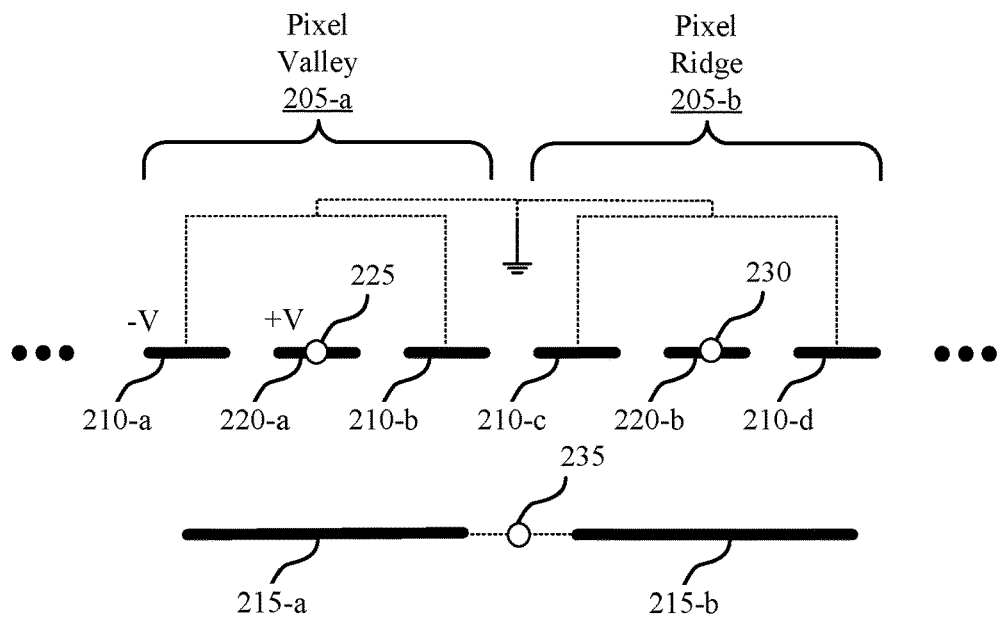
FIG. 2A illustrates an example of a sensing scheme that supports reducing background signal in imaging sensors in accordance with aspects of the present disclosure.

FIG. 2A illustrates an example of a sensing scheme 200-a that supports reducing background signal in imaging sensors in accordance with aspects of the present disclosure. In some examples, the sensing scheme 200-a may implement aspects of the system 100. For example, a sensor, such as an ultrasonic imaging sensor having one or more transducer components (e.g., PMUTs) may determine ridges and valleys of a fingerprint for biometric sensing purposes. In some examples, the sensor configurable (or configured) with one or more PMUT components (e.g., 3-port PMUTs) may achieve reducing background signals in ultrasonic imaging sensors.

An ultrasonic imaging sensor may include a pixel array, where each pixel in the pixel array may include at least three electrodes. For example, pixel valley 205-a may be a pixel that may sense a valley of a fingerprint, while pixel ridge 205-b may be a pixel that may sense a ridge of the fingerprint. In some examples, the pixel valley 205-a and the pixel ridge 205-b may be simply referred to as a pixel. The pixels 205-a, 205-b may be neighboring pixels of a pixel array. The pixels 205-a, 205-b may each have at least three electrodes associated with a respective pixel.

Figure 2B:
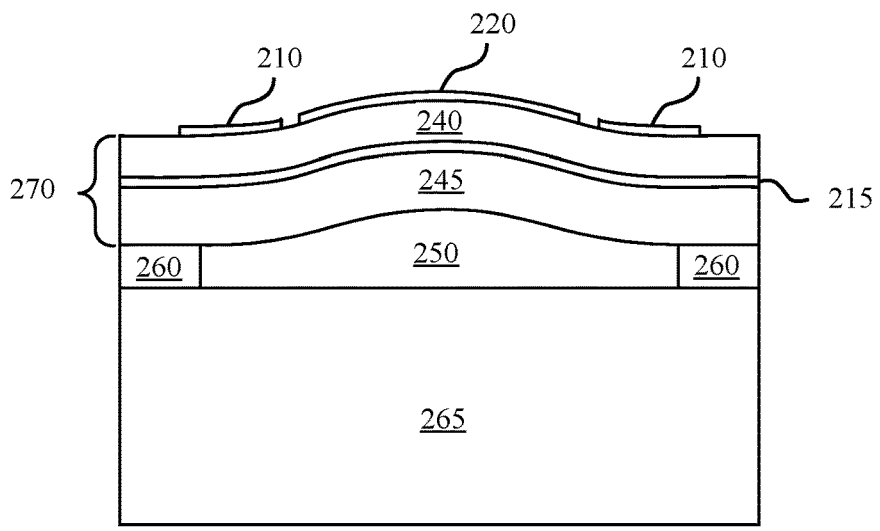
FIG. 2B illustrates an example of a cross-sectional view of a piezoelectric micromechanical ultrasonic transducers (PMUT) that supports reducing background signal in imaging sensors in accordance with aspects of the present disclosure.

For example, pixel 205-a may have electrodes 210-a, 210-b (which may be outer electrodes associated with a PMUT configuration), and pixel 205-b may have electrodes 210-c, 210-d (which may also be outer electrodes associated with a PMUT configuration). In some examples, the electrodes 210-a, 210-b associated with the pixel 205-a and the electrodes 210-c, 210-d associated with the pixel 205-b may be disposed on a surface of a piezoelectric layer (e.g., in a PMUT configuration, for example, as illustrated in FIG. 2B). The electrodes 210-a, 210-b associated with the pixel 205-a and the electrodes 210-c, 210-d associated with the pixel 205-b may be substantially coplanar. In some examples, the electrodes 210-a, 210-b associated with the pixel 205-a may be connected together (e.g. via shorting the two electrodes) and the electrodes 210-c, 210-d associated with the pixel 205-b may be additionally be connected together (e.g. via shorting the two electrodes). In some examples, a configuration (e.g., a quantity, a position, placement) of electrodes 210, 220 may be different when a pixel is at an edge of an array of pixels.

As part of the sensing scheme, the electrodes 210-a, 210-b associated with the pixel 205-a and the electrodes 210-c, 210-d associated with the pixel 205-b may be shorted from each neighboring pixel and grounded during a transmit mode and a receive mode. In the context of an ultrasonic fingerprint imager, the transmit mode and the receive mode may be associated with sensing an ultrasonic wave that may travel through a surface on which a person's finger may be placed to obtain a fingerprint image. After passing through the surface, some portions of the ultrasonic wave encounter skin that is in contact with the surface (e.g., fingerprint ridges), while other portions of the ultrasonic wave encounter air (e.g., valleys between adjacent ridges of a fingerprint) and may be reflected with different intensities back towards the ultrasonic sensor. The reflected signals associated with the finger may be processed and converted to a digital value representing the signal strength of the reflected signal. When multiple reflected signals are collected over a distributed area, the digital values of such signals may be used to produce a graphical representation of the signal strength over the distributed area (e.g., by converting the digital values to an image), thereby producing an image of the fingerprint. Thus, an ultrasonic sensor system may be used as a fingerprint sensor or other type of biometric sensor (e.g., in some implementations, the detected signal strength may be mapped into a contour map of the finger that is representative of the depth of the ridge structure detail).

In some examples, the electrode 215-a associated with the pixel 205-a and the electrode 215-b associated with the pixel 205-b may be coupled or connected (e.g., shorted) together. During the transmit mode, the sensing scheme may couple the electrode 215-a associated with the pixel 205-a and the electrode 215-b associated with the pixel 205-b to a sense amplifier based in part on activating a switch component coupled with the at least one electrode and the sense amplifier. In some examples, each electrode 215 may have a separate independent sense amplifier and switch component.

In some examples, after coupling the electrode 215-a associated with the pixel 205-a and the electrode 215-b associated with the pixel 205-b to a sense amplifier, the sensing scheme may sense a voltage signal, or a current signal of the electrode 215-a associated with the pixel 205-a and the electrode 215-b associated with the pixel 205-b via the sense amplifier(s). In some examples, the sensed voltage signal or current signal may be indicative of the ultrasonic wave (and/or the reflected ultrasonic wave) from a feature (e.g., finger of a user). The sensing scheme may also ground electrode 220-a associated with the pixel 205-a and the electrode 220-b associated with the pixel 205-b during the transmit mode. After the transmit mode, the sensing scheme may decouple the electrode 215-a associated with the pixel 205-a and the electrode 215-b associated with the pixel 205-b from the sense amplifier(s) based in part on activating the switch component coupled with the electrodes 215 and the sense amplifier(s) during the receive mode.

The sensing scheme may, during a receive mode as one example, maintain the electrodes 210-a, 210-b associated with the pixel 205-a and the electrodes 210-c, 210-d associated with the pixel 205-b grounded. In addition, the sensing scheme may float the electrode 215-a associated with the pixel 205-a and the electrode 215-b associated with the pixel 205-*b*. Floating a component (e.g., an electrode) may refer to that component not being fixed to a particular voltage source.

For example, the sensing scheme may float the electrodes 215 associated with each pixel 205 based in part on toggling a switch component positioned between each of the electrodes 215 and the sense amplifier(s) associated with each of the electrodes 215 during the receive mode. The background signal may be reduced (e.g., to zero) by floating the electrodes 215 during the receive mode. That is, the signals from the electrodes 210 (e.g., −V) and the electrodes 220 (e.g., +V) may be canceled. The sensing scheme may then couple the electrode 220-*a* associated with the pixel 205-*a* and the electrode 220-*b* associated with the pixel 205-*b* with a sense amplifier based in part on activating a second switch component coupled with the electrode 220-*a* associated with the pixel 205-*a* and the electrode 220-*b* associated with the pixel 205-*b*, or the sense amplifier, or a combination thereof. In some examples, each electrode 220 may have a separate switch component coupled with it, as well as an independent sense amplifier. As part of the receive mode, the sensing scheme may sense (receive reflected signals) via the electrode 220-*a* associated with the pixel 205-*a* and the electrode 220-*b* associated with the pixel 205-*b*.

The sensing scheme may then determine a difference in amplitudes between the ridges and the valleys associated with the fingerprint based in part on the set of signals sensed across the pixels 205, and output a representation of the fingerprint using an image processing technique on the set of signals. For example, the sensing scheme may sense, according to the detailed sensing scheme above, during a transmit mode, a first set of signals associated with one or more pixels 205 of the pixel array, and sense, during a receive mode, a second set of signals associated with the one or more pixels 205 of the pixel array. In addition to outputting a representation of the fingerprint, the sensing scheme may reduce a background signal associated with the ultrasonic imaging sensor based in part on the sensing of the first set of signals and the second set of signals.

By way of example, a signal strength 225 (e.g., voltage signal drop) across the electrode 220-*a* associated with the pixel 205-*a* may be V (volts) and a signal strength 230 ((e.g., voltage signal drop) across the electrode 220-*b* associated with the pixel 205-*b* may be R (volts). In addition, a signal strength 235 (e.g., voltage signal drop) across the electrodes 215 (e.g., shorted electrodes) may be given by the following expression, as one example: −V−R/2. Thus, the combined signal strength across the pixel 205-*a* may be given by the following expression:

$$V + \frac{-V-R}{2},$$

while the combined signal strength across the pixel 205-*b* may be given by the following expression:

$$R + \frac{-V-R}{2}.$$

Both expressions may be simplified to $$\frac{V-R}{2}$$

for the combined signal strength across the pixel 205-*a* and $$\frac{R-V}{2}$$

for the combined signal strength across the pixel 205-*b*. As a result, the differences in signal amplitudes between the ridges and valleys—the delta signal may be Δ=V−R. Additionally, the background signal using the sensing scheme described herein may be reduced (e.g., to zero). That is, the background signal is reduced to zero by floating the electrodes 215 during the receive mode, the signals from the electrodes 210 (e.g., −V) and the electrodes 220 (e.g., +V) may be canceled.

FIG. 2B illustrates an example of a cross-sectional view of a PMUT 200-*b* that supports reducing background signal in imaging sensors in accordance with aspects of the present disclosure. In some examples, the PMUT 200-*b* may implement aspects of the system 100. A sensor, such as an ultrasonic imaging sensor having one or more transducer components (e.g., PMUTs 200-*b*) may determine ridges and valleys of a fingerprint for biometric sensing purposes. For examples, PMUT 200-*b* may correspond to a sensor element of an array of sensors capable of sensing pixel valley 205-*a* or pixel ridge 205-*b* with reference to FIG. 2A. In some examples, the sensor configurable (or configured) with one or more PMUTs 200-*b* components (e.g., 3-port PMUTs) may achieve reducing background signals in ultrasonic imaging sensors.

PMUT 200-*b* may include a piezoelectric layer 240 and a mechanical layer 245 that may be configurable to form a diaphragm 270, which may be disposed above a cavity 250. In some examples, the diaphragm 270 may be supported by two anchor structure 260, where each anchor structure 260 is positioned adjacent to the cavity 250. The PMUT 200-*b* may in some examples include a lower electrode 245 positioned below the piezoelectric layer 240. The PMUT 200-*b* may additionally include an inner electrode 220, which may correspond to electrodes 220-*a* or 220-*b* with reference to FIG. 2A. The inner electrode 220 may be positioned above the piezoelectric layer 240 in a central region of the diaphragm 270. In some examples, the PMUT 200-*b* may additionally, or alternatively include outer electrodes 210, which may correspond to a set of electrodes 210, for example, such as electrodes 210-*a*, 210-*b* or 210-*c*, 210-*d* with reference to FIG. 2A. The outer electrodes 210 may also be disposed above the piezoelectric layer 240. Electrodes 210 may be coplanar respective to each other. PMUT 200-*b* may also include a PMUT sensory array substrate 260 capable of emitting and detecting one or more ultrasonic waves. Contact and via structures may be used to make electrical contact with underlying or external pixel circuitry, in some examples.

Accordingly, the described techniques relate to improved methods, systems, devices, and apparatuses that support PMUTs, and more specifically reducing background signals in ultrasonic imaging sensors configurable (or configured with) PMUTs to determine ridges and valleys of a fingerprint. In some examples, the PMUT may be a 3-port PMUT, which may achieve reducing background signals in ultrasonic imaging sensors. That is, a set of electrodes disposed above a piezoelectric layer of the 3-port PMUT may exhibit opposite signs of voltage caused by a same direction of deflection, which may reduce background signals and sustain an intensity of a delta signal.

Figure 3:
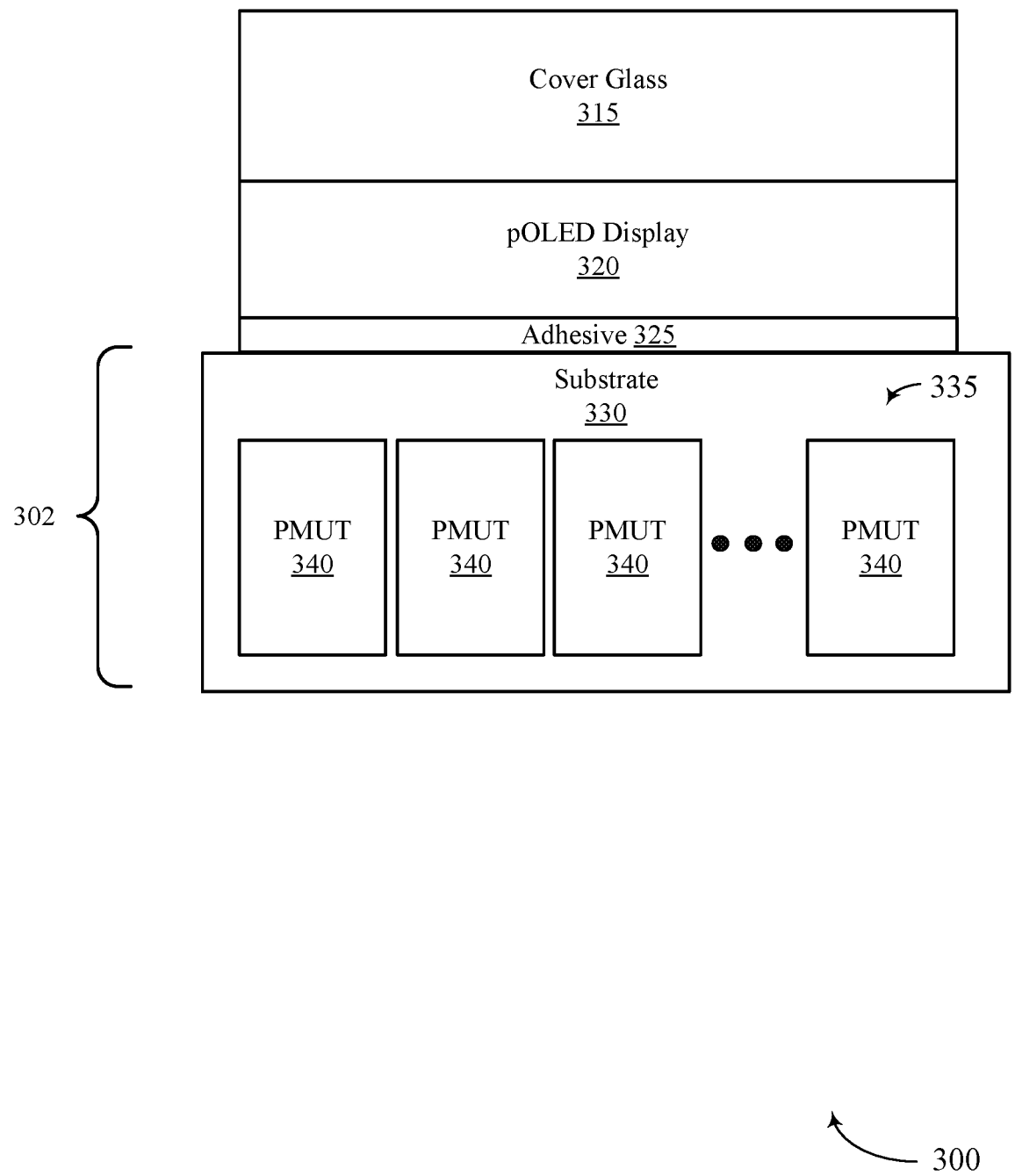
FIG. 3 illustrates an example of a sensor architecture that supports reducing background signal in imaging sensors in accordance with aspects of the present disclosure.

FIG. 3 illustrates an example of a sensor architecture 300 that supports reducing background signals in imaging sensors in accordance with aspects of the present disclosure. In some examples, the sensor architecture 300 may implement aspects of the system 100. The sensor architecture 300 may include a cover (e.g., cover glass 315), a display (e.g., a pOLED display 320), and one or more sensors (e.g., a sensor 302). The sensor 302 may include a pixel array 335 (e.g., transmit and receive electrode array). In some examples, the sensor 302 may be an ultrasonic imaging sensor configured to determine ridges and valleys of a fingerprint. By way of example, the ultrasonic imaging sensor may include the pixel array 335 with at least some if not each pixel of the pixel array 335 including a set of electrodes (e.g., an electrode such as a pixel electrode associated with each pixel of the pixel array 335) having at least three electrodes.

For example, the sensor 302 may include one or more PMUTs 340, which may be for example, 3-port PMUTs. That is, each pixel electrode of the pixel array 335 may be connected to or associated with a 3-port PMUT. In some examples, PMUTs 340 may be an example of or include components of PMUT 200-b as described herein. In some examples, additionally, the sensor architecture 300 may have touch interface functionality. In some cases, some components of sensor architecture 300 may be removed or replaced (e.g., by similar or otherwise suitable components). In some cases, additional components may be added to the sensor architecture 300. Further, in some cases, components of the sensor architecture 300 may be rearranged or reordered (e.g., the disclosure is not limited to the illustrated arrangement, as the sensor 302 may be flipped upside down within the sensor architecture 300 and still maintain functionality).

The cover glass 315 may refer to any display cover material, with examples including plastic, ceramic, sapphire, glass, etc. In some implementations, the cover glass 315 may be a cover plate, such as a cover plastic or a lens plastic for a pOLED display 320 of a display device (e.g., mobile device, tablet, etc.). For example, a feature, such as a portion of a hand, finger, palm, etc., may be placed upon the cover glass 315, and feature detection and imaging may be performed through the cover glass 315. In some cases, the cover glass 315 may include one or more polymers, such as one or more types of parylene for applications in which a thin layer is desired. In some implementations, the cover glass 315 may be placed over and coupled with a pOLED display 320 as a protective layer. In some implementations the cover glass 315 may extend beyond the span of the pOLED display 320 or vice versa. In other cases, the cover glass 315 and the pOLED display 320 may span the same area.

A pOLED display 320 may refer to a display component or a visual display included underneath cover glass 315. A pOLED display 320 may be attached to the sensor 302 by an adhesive 325 (e.g., a thermally cured epoxy, a UV-curable epoxy etc.). In some cases, the sensor 302 may include the adhesive 325. In some cases, the cover glass 315, and the pOLED display may extend beyond the span of the sensor 302. In other cases, the sensor 302 may span the area of the pOLED display 320 and the cover glass 315. In some examples, the sensor 302 may be configured to transmit ultrasonic waves and to receive ultrasonic sensor signals corresponding to ultrasonic waves reflected from a feature (e.g., a finger of the user 140) in contact with the cover glass 315.

Substrate 330 may have an array of ultrasonic transmitting and receiving pixels. In some examples, PMUTs 340 (e.g., 3-port PMUTs) may be fabricated, positioned, located, configured on substrate 330. Different implementations may use different materials for the substrate 330. In some cases, the substrate 330 may be a silicon substrate, a thin-film transducer substrate, a glass substrate, etc. An array of PMUTs 340 may be bonded (e.g., coupled, connected, configured) with pOLED display 320 via an adhesive (e.g., adhesive 325). Ultrasonic waves may be transmitted, by the pixel array 335, through a sensor stack of the sensor 302 and towards an overlying feature (e.g., finger). The various layers of the sensor stack may, in some examples, include one or more substrates of glass or other material (such as plastic or sapphire). In some cases, the sensor stack may include a substrate to which a light source system (not shown) may be coupled, which may be a backlight of a display according to some implementations. In alternative implementations, a light source system may be coupled to a front light. Accordingly, in some implementations a light source system may be configured for illuminating a display and the target feature (e.g. finger).

In some cases, PMUTs 340 in the pixel array 335 may include an array of pixels with transmit and receive drive circuitry and timing controls. In some cases, the PMUTs 340 (e.g., which may drive and sense ultrasonic signals) may include pixel electrodes each associated with a pixel of the pixel array 335. In some cases, the pixel array 335 may refer to a transceiver array, or to pixel array, pixel circuitry, and corresponding pixel electrodes. A focused ultrasonic signal may be transmitted by the pixel array 335 and may travel towards a finger (or other feature to be detected), passing through at least the cover glass 315 and the pOLED display 320. A portion of the wave not absorbed by the feature to be detected may be reflected by the feature. The reflected signal may pass back through the cover glass 315 and the pOLED display 320 and may be received by the sensor 302.

As described herein, the sensor 302 may include PMUTs 340. In some cases, the PMUTs 340 may be formed as a continuous layer on a surface of the substrate 330. In some examples, PMUTs 340 may have one or more piezoelectric layers. Specific examples of piezoelectric materials that may be employed include ferroelectric polymers such as polyvinylidene fluoride (PVDF) and polyvinylidene fluoride-trifluoroethylene (PVDF-TrFE) copolymers. Other examples of piezoelectric materials that may be employed include polyvinylidene chloride (PVDC) homopolymers and copolymers, polytetrafluoroethylene (PTFE) homopolymers and copolymers, and diisopropylammonium bromide (DIPAB).

In some cases, piezoelectric layers material may be selected based in part on manufacturability considerations (e.g., such as material cost and availability), pixel isolation properties, properties of the PMUTs 340 or sensor 302, etc. For example, a piezoelectric material may be selected based on its material properties effect on pixel isolation for certain pixel array size and spacing (e.g., sensor 302 configurations, such as sensor configurations with tightly spaced electrodes, may use copolymers associated with a greater degree of pixel isolation). In some cases, piezoelectric layers may be selected based on acoustic properties of the selected material, as well as the dimensions and configuration of the pixel array (e.g., to support reducing background signals for the given sensor 302 configuration). The thickness of piezoelectric layers in PMUTs 340 may be selected so as to support the transmitting and receiving of ultrasonic waves.

Ultrasonic waves may be generated by applying a voltage to the PMUTs 340 to expand or contract one or more of the layers, with reference to FIG. 2B, depending upon the signal applied, thereby generating a signal. A voltage may be applied to the PMUTs 340. In this fashion, an ultrasonic signal may be made by changing the thickness of piezoelectric layers of PMUTs 340 via a piezoelectric effect (e.g., acoustic wave or acoustic wave components may propagate from various locations of the piezoelectric layers according to various applied voltage across different locations of the layer, resulting or cumulating in a focused ultrasonic wave transmission). Example frequencies of the ultrasonic waves may be in the range of 5 MHz to 30 MHz, with wavelengths on the order of a millimeter or less.

In some examples, sensor architecture 300 may optionally include a sensing circuit (not shown) and may be coupled to the PMUTs 340. The sensing circuit may include one or more dielectric layers and interconnects (e.g., traces, vertical interconnect access (VIAs), and pads). In some implementations, the sensing circuit may be electrically coupled to a sensor controller or other circuitry (e.g., a control unit, control circuitry or an applications processor) for signal processing of signals to/from the sensor 302. In some implementations, the sensing circuit may include other functionality, such as one or more capacitive touch electrodes for low-power wakeup, menu selection and navigation functionality.

The present disclosure describes a sensing scheme associated with the sensor architecture 300 for reducing background signals in ultrasonic imaging sensors. It provides systems, methods and techniques by which the sensor architecture 300 (e.g., fingerprint sensor, finger touch sensor, heart rate sensor, blood flow sensor, etc.) including one or more transducer components (e.g., 3-port PMUTs) may be used as an effective solution for reducing background signals.

By way of example, each pixel of the pixel array 335 may be associated with at least three electrodes of PMUTs 340. That is, each pixel of the pixel array 335 may have an electrode associated with the pixel array 335, a first electrode associated with a first electrode layer of PMUTs 340, and a second electrode associated with a second electrode layer of PMUTs 340. The sensing scheme may include sensing, e.g., during a transmit mode, a first set of signals associated with one or more pixels of the pixel array 335 using at least one electrode of the set of electrodes, sensing, e.g., during a receive mode, a second set of signals associated with the one or more pixels of the pixel array 335 array using the at least one electrode, and reducing a background signal associated with the sensor 302 based in part on the sensing of the first set of signals and the second set of signals. The sensing scheme may include determining a difference in amplitudes between the ridges and the valleys associated with the fingerprint based in part on the first set of signals and the second set of signals, and output a representation of the fingerprint using an image processing technique on the first set of signals and the second set of signals.

With reference to FIG. 2A, the electrodes 210-a, 210-b associated with the pixel 205-a (of the pixel array 335) and the electrodes 210-c, 210-d associated with the pixel 205-b (of the pixel array 335) may relate to electrodes of the PMUT 340 (e.g., electrodes 210, 215, 220 with reference to FIG. 2B), and as part of the sensing scheme these electrodes may be shorted from each neighboring pixel and grounded during a transmit mode and a receive mode. In some examples, the electrode 215-a associated with the pixel 205-a and the electrode 215-b associated with the pixel 205-b may relate to electrodes of the PMUT 340, as well as electrodes 210, 215, 220 with reference to FIG. 2B, and as part of the sensing scheme may be shorted together.

Further with reference to FIG. 2A, during the transmit mode, the sensing scheme may couple the electrode 215-a (of the PMUT 340) associated with the pixel 205-a and the electrode 215-b (of the PMUT 340) associated with the pixel 205-b to a sense amplifier based in part on activating a switch component coupled with the at least one electrode and the sense amplifier. In some examples, each electrode 215 (of the PMUT 340) may have a separate independent sense amplifier and switch component. In some examples, after coupling the electrode 215-a (of the PMUT 340) associated with the pixel 205-a and the electrode 215-b (of the PMUT 340) associated with the pixel 205-b to a sense amplifier, the sensing scheme may sense a voltage signal, or a current signal of the electrode 215-a (of the PMUT 340) associated with the pixel 205-a and the electrode 215-b (of the PMUT 340) associated with the pixel 205-b via the sense amplifier(s).

In some examples, the sensed voltage signal or current signal may be indicative of the ultrasonic wave (and/or the reflected ultrasonic wave) from a feature (e.g., finger of a user). The sensing scheme may also ground electrode 220-a (electrode of the PMUT 340) associated with the pixel 205-a and the electrode 220-b (electrode of the PMUT 340) associated with the pixel 205-b during the transmit mode. After the transmit mode, the sensing scheme may decouple the electrode 215-a (of the PMUT 340) associated with the pixel 205-a and the electrode 215-b (of the PMUT 340) associated with the pixel 205-b from the sense amplifier(s) based in part on activating the switch component coupled with the electrodes 215 (of the PMUT 340) and the sense amplifier(s) during the receive mode.

In the receive mode, the sensing scheme may maintain the electrodes 210-a, 210-b (of the PMUT 340) associated with the pixel 205-a and the electrodes 210-c, 210-d (of the PMUT 340) associated with the pixel 205-b grounded. In addition, the sensing scheme may float the electrode 215-a (of the PMUT 340) associated with the pixel 205-a and the electrode 215-b (of the PMUT 340) associated with the pixel 205-b. For example, the sensing scheme may float the electrodes 215 (of the PMUT 340) associated with each pixel 205 based in part on toggling a switch component positioned between each of the electrodes 215 (of the PMUT 340) and the sense amplifier(s) associated with each of the electrodes 215 (of the PMUT 340) during the receive mode.

The background signal may be reduced by floating the electrodes 215 (of the PMUT 340) during the receive mode. That is, the signals from the electrodes 210 (of the PMUT 340) (e.g., −V) and the electrodes 220 (electrodes of the pixel array 335) (e.g., +V) may be canceled. The sensing scheme may then couple the electrode 220-a (electrodes of the pixel array 335) associated with the pixel 205-a and the electrode 220-b (electrodes of the pixel array 335) associated with the pixel 205-b. As part of the receive mode, the sensing scheme may open the electrode 220-a (electrodes of the pixel array 335) associated with the pixel 205-a and the electrode 220-b (electrodes of the pixel array 335) associated with the pixel 205-b for sensing (receiving reflected signals).

The sensing scheme may then determine a difference in amplitudes between the ridges and the valleys associated with the fingerprint based in part on the set of signals sensed across the pixels of the pixel array 335, and output a representation of the fingerprint using an image processing technique on the set of signals. For example, the sensing scheme may sense, according to the detailed sensing scheme above, during a transmit mode, a first set of signals associated with one or more pixels of the pixel array 335, and sense, during a receive mode, a second set of signals associated with the one or more pixels of the pixel array 335.

In addition to outputting a representation of the fingerprint, the sensing scheme may reduce a background signal associated with the ultrasonic imaging sensor based in part on the sensing of the first set of signals and the second set of signals.

Accordingly, the sensor architecture 300 in combination with the sensing scheme reduces background signals in ultrasonic imaging sensors configurable (or configured with) PMUTs to determine ridges and valleys of a fingerprint. In some examples, the PMUT may be a 3-port PMUT, which may achieve reducing background signals in ultrasonic imaging sensors. That is, a set of electrodes of the 3-port PMUT may exhibit opposite signs of voltage caused by a same direction of deflection, which may reduce background signals and sustain an intensity of a delta signal. Therefore, 3-port PMUTs may cancel out background noise (e.g., copolymer bending without uni-poled electrodes at either side results in lower common mode noise).

Figure 4:
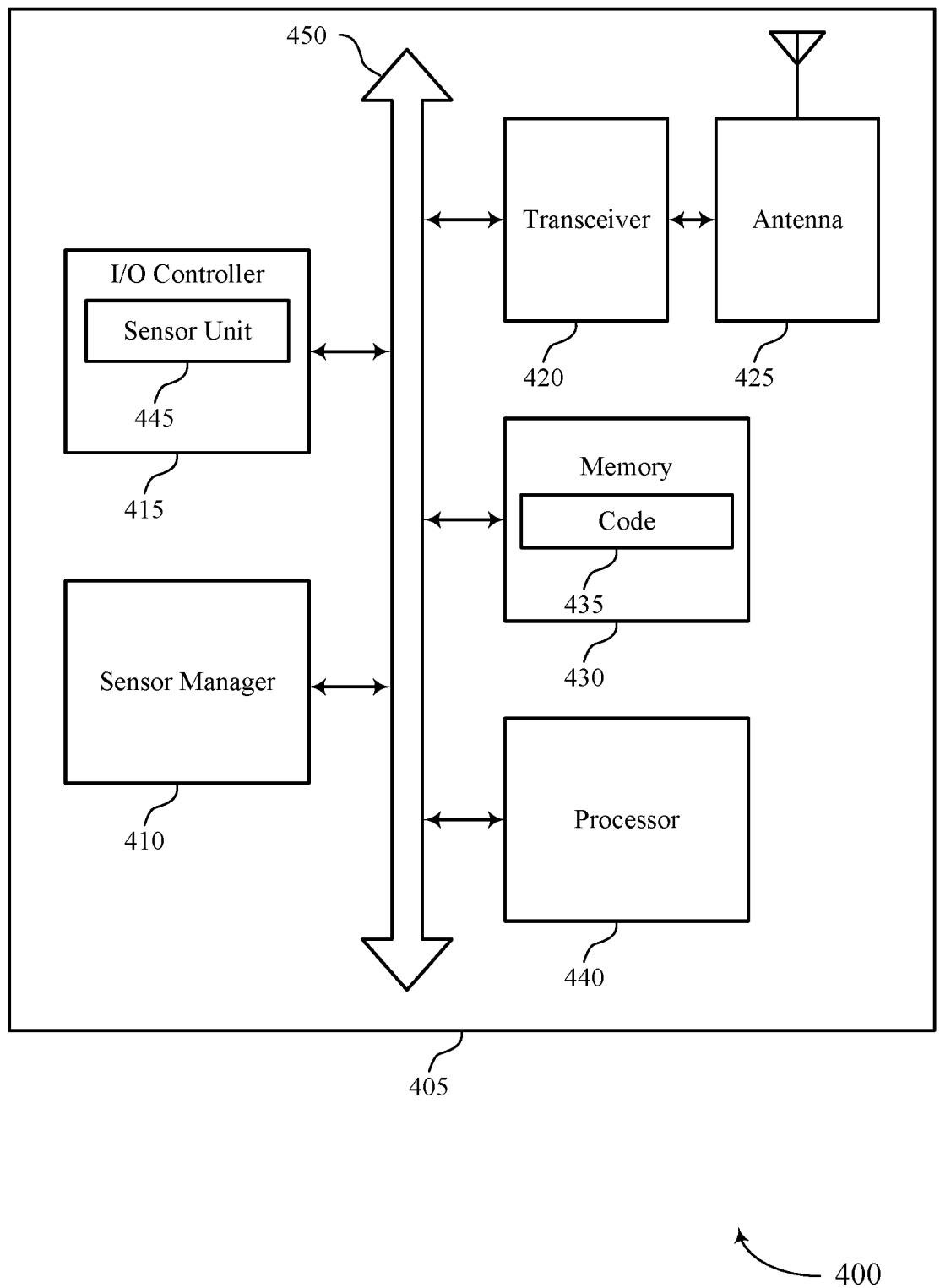
FIG. 4 shows a block diagram of a device that supports reducing background signal in imaging sensors in accordance with aspects of the present disclosure.

FIG. 4 shows a diagram of a system 400 including a device 405 that supports reducing background signal in imaging sensors in accordance with aspects of the present disclosure. The device 405 may be an example of or include the components of device 110 as described herein. The device 405 may include an ultrasonic imaging sensor configured to determine ridges and valleys of a fingerprint. The ultrasonic imaging sensor may include a pixel array with each pixel of the pixel array including a set of electrodes having at least three electrodes. For example, the ultrasonic imaging sensor may include a 3-port PMUT. The device 405 may include components for bi-directional data communications including components for transmitting and receiving communications, including a sensor manager 410, an I/O controller 415, memory 430, and a processor 440. These components may be in electronic communication via one or more buses (e.g., bus 450).

The sensor manager 410 may perform a sensing scheme that reduces background signal in sensors (e.g., imaging sensors configured with PMUTs). The sensing scheme may include the sensor manager 410 sensing, during a transmit mode, a first set of signals associated with one or more pixels of a pixel array using at least one electrode of a set of electrodes, sensing, during a receive mode, a second set of signals associated with the one or more pixels of the pixel array using the at least one electrode, reducing a background signal associated with the ultrasonic imaging sensor based in part on the sensing of the first set of signals and the second set of signals.

In some examples, the sensor manager 410 may determine a difference in amplitudes between the ridges and the valleys associated with the fingerprint based at least in part on the first set of signals and the second set of signals, and output a representation of the fingerprint using an image processing technique on the first set of signals and the second set of signals. The sensor manager 410 may ground at least two electrodes of the set of electrodes associated with the one or more pixels of the pixel array during the transmit mode to sense, during the transmit mode, the first set of signals associated with the one or more pixels of the pixel array. In some examples, the at least two electrodes of the set of electrodes are in contact with an upper surface of a piezoelectric layer of a PMUT and the piezoelectric layer may be uni-poled. The ultrasonic imaging sensor may include the PMUT (e.g., 3-port PMUT).

The sensor manager 410 may couple the at least one electrode of the set of electrodes with a sense amplifier based at least in part on activating a switch component coupled with the at least one electrode and the sense amplifier. The sensor manager 410 may sense a voltage signal or a current signal of the at least one electrode of the set of electrodes via a sense amplifier to sense, during the transmit mode, the first set of signals associated with the one or more pixels of the pixel array. In some examples, the first set of signals associated with the one or more pixels of the pixel array may include the voltage signal or the current signal of the at least one electrode.

The sensor manager 410 may short the at least one electrode by clamping the voltage signal or the current signal of the at least one electrode to ground during the receive mode. The sensor manager 410 may decouple the at least one electrode of the set of electrodes from the sense amplifier based at least in part on activating a switch component coupled with the at least one electrode and the sense amplifier during the receive mode. In some examples, the at least one electrode is in contact with a lower surface of a piezoelectric layer of a PMUT and the piezoelectric layer may be uni-poled.

In some examples, the sensor manager 410 may ground a first electrode of the set of electrodes during the receive mode. The sensor manager 410 may float a second electrode of the set of electrodes during the receive mode by decoupling the second electrode from a sense amplifier based at least in part on toggling a switch component positioned between the second electrode and the sense amplifier during the receive mode to sense, during the receive mode, the second set of signals associated with the one or more pixels of the pixel array. In some examples, the first electrode is in contact with an upper surface of a piezoelectric layer of a PMUT, and the second electrode is in contact with a lower surface of the piezoelectric layer of the PMUT. The sensor manager 410 may couple a third electrode of the set of electrodes with a second sense amplifier based at least in part on activating a second switch component coupled with the third electrode and the second sense amplifier.

The sensor manager 410 may sense a voltage signal or a current signal of the third electrode associated with the one or more pixels of the pixel array via the second sense amplifier to sense, during the receive mode, the second set of signals associated with the one or more pixels of the pixel array. In some examples, the second set of signals associated with the one or more pixels of the pixel array comprises the voltage signal or the current signal of the third electrode associated with the one or more pixels of the pixel array. In some examples, a first electrode of the set of electrodes associated with the one or more pixels of the pixel array is grounded during the transmit mode and the receive mode.

The sensor manager 410, or its sub-components, may be implemented in hardware, code (e.g., software or firmware) executed by a processor, or any combination thereof. If implemented in code executed by a processor, the functions of the sensor manager 410, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The sensor manager 410, or its sub-components, may be physically located at various positions, including being distributed such that portions of functions are implemented at different physical locations by one or more physical components. In some examples, the sensor manager 410, or its sub-components, may be a separate and distinct component in accordance with various aspects of the present disclosure. In some examples, the sensor manager 410, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The I/O controller 415 may manage input and output signals for the device 405. The I/O controller 415 may also manage peripherals not integrated into the device 405. In some cases, the I/O controller 415 may represent a physical connection or port to an external peripheral. In some cases, the I/O controller 415 may utilize an operating system such as iOS, ANDROID, MS-DOS, MS-WINDOWS, OS/2, UNIX, LINUX, or another known operating system. In other cases, the I/O controller 415 may represent or interact with a modem, a keyboard, a mouse, a touchscreen, or a similar device. In some cases, the I/O controller 415 may be implemented as part of a processor. In some cases, a user may interact with the device 405 via the I/O controller 415 or via hardware components controlled by the I/O controller 415.

In some examples, the I/O controller 415 may include a sensor unit 445. The sensor unit 445 may include one or more sensors (e.g., which may be referred to as an ultrasonic sensor, and electrode array, a scanner, etc.) to sense biometric information (e.g., to determine valley and ridges of a fingerprint). The sensor unit 445 may include a pixel array with each pixel of the pixel array including a set of electrodes having at least three electrodes. The sensor unit 445 may also be configured with multiple functionalities (e.g., reducing background signals, while also biometric sensing). For example, the sensor unit 445 may output one or more signals (e.g., signals sensed during transmit mode and receive mode) or imaging information indicative of traits (e.g., biometric traits) associated with a fingerprint (or other object). In response to the one or more signals, the processor 440 may image the fingerprint, perform an authentication analysis, etc. In some cases, the sensor unit 445 may be attached to or mounted on a frame of the device 405 near or under a cover surface of the device's display (e.g., an OLED display, a pOLED display, etc.).

The device 405 may also include electrical connections associated with the sensor unit 445 and the processor 440. In some examples, the sensor manager 410 may control various aspects of the sensor unit 445 (e.g., ultrasonic transmitter timing and excitation waveforms, bias voltages for the ultrasonic receiver and pixel circuitry, pixel addressing, signal filtering and conversion, readout frame rates, and so forth). For example, the processor 440 may send an excitation signal to a driver of each electrode (e.g., or a channel of electrodes) to cause the driver to produce ultrasonic waves or signals. The processor 440 may send level select input signals through another bias driver to bias one or more electrodes and allow gating of acoustic signal detection by the sensor unit 445 (e.g., pixel circuitry). A demultiplexer may be used to turn on and off gate drivers that cause a particular row or column of the sensor unit 445 (e.g., sensor pixel circuits) to provide sensor output signals. Output signals from the pixels may be sent through a charge amplifier, a filter (e.g., an anti-aliasing filter), and a digitizer to the processor 440.

The memory 430 may include RAM and ROM. The memory 430 may store computer-readable, computer-executable code or software 435 including instructions that, when executed, cause the processor to perform various functions described herein. In some cases, the memory 430 may contain, among other things, a BIOS which may control basic hardware or software operation such as the interaction with peripheral components or devices.

The software 435 may include instructions to implement aspects of the present disclosure, including instructions to support biometric scanning. The software 435 may be stored in a non-transitory computer-readable medium such as system memory or other type of memory. In some cases, the software 435 may not be directly executable by the processor 440 but may cause a computer (e.g., when compiled and executed) to perform functions described herein.

The processor 440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 440 may be configured to operate a memory array using a memory controller. In other cases, a memory controller may be integrated into the processor 440. The processor 440 may be configured to execute computer-readable instructions stored in a memory (e.g., the memory 430) to cause the device 405 to perform various functions (e.g., functions or tasks reducing background signals in imaging sensors, supporting ultrasonic biometric sensing).

The processor 440 may receive the one or more signals representative of a fingerprint, and may process such information as discussed herein (e.g., the processor 440 may image a fingerprint, perform authentication procedures, etc.). In some cases, the processor 440 and/or sensor unit 445 may introduce an applied voltage that may drive one or more electrodes of the sensor unit 445 to transmit an ultrasonic signal. The processor 440 may receive data from the sensor unit 445 that may include translating digitized data into image data of the fingerprint or format the data for further processing (e.g., such as for authentication procedures). In some other cases, the processor 440 and/or sensor unit 445 may apply bias voltages to one or more electrodes of the sensor unit 445 to receive a reflected signal, such that the processor may output a representation of the fingerprint using an image processing technique.

As detailed above, the sensor manager 410 and/or one or more components of the sensor manager 410 may perform and/or be a means for performing, either alone or in combination with other components, one or more operations for supporting reducing background signal in imaging sensors.

Figure 5:
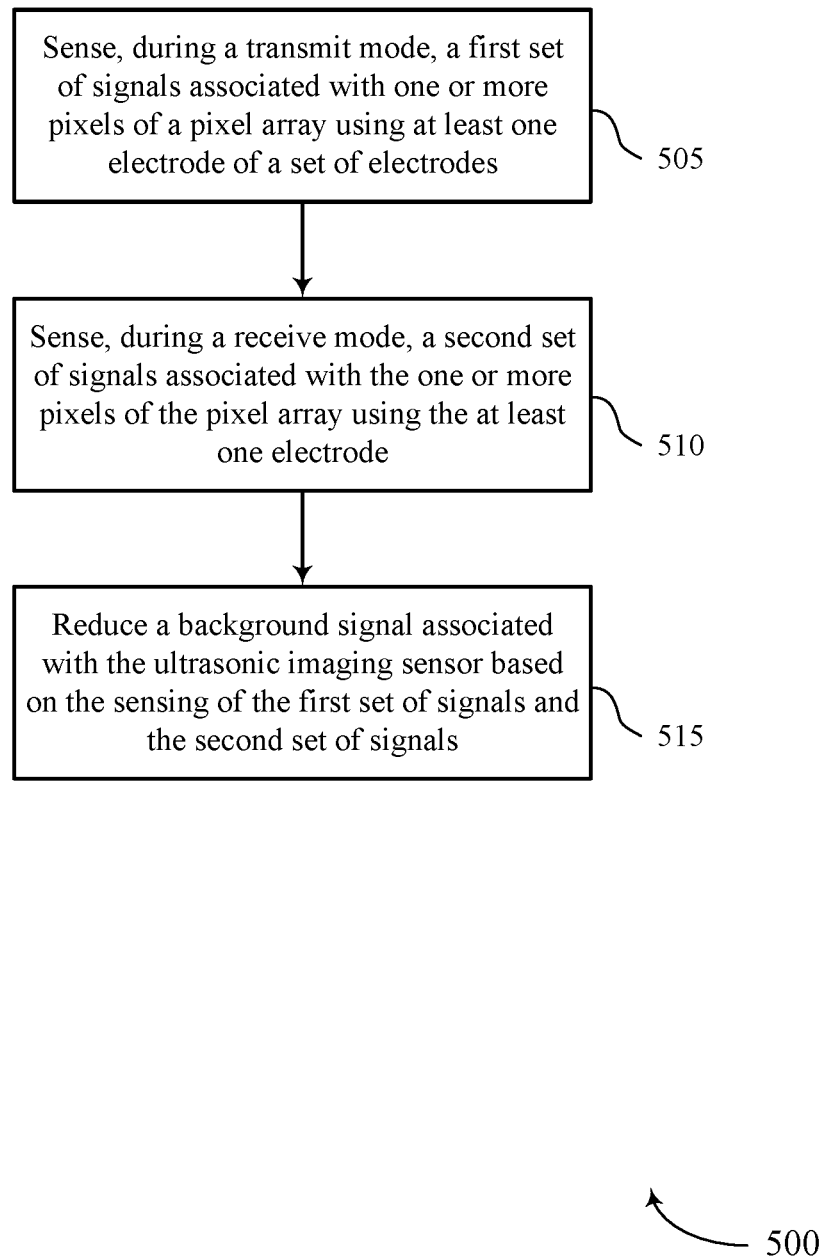
FIGS. 5 through 7 show flowcharts illustrating methods that support reducing background signal in ultrasonic imaging sensors in accordance with aspects of the present disclosure.

FIG. 5 shows a flowchart illustrating a method 500 that supports reducing background signal in imaging sensors in accordance with aspects of the present disclosure. The operations of method 500 may be implemented by a device or its components as described herein. For example, the operations of method 500 may be performed by a sensor manager as described with reference to FIG. 4. The device may include an ultrasonic imaging sensor configured to determine ridges and valleys of a fingerprint. The ultrasonic imaging sensor may include a pixel array with each pixel of the pixel array including a set of electrodes having at least three electrodes. For example, the ultrasonic imaging sensor may include a 3-port PMUT. In some examples, a device may execute a set of instructions to control the functional components of the device to perform the functions described below. Additionally, or alternatively, a device may perform aspects of the functions described below using special-purpose hardware.

At 505, the device may sense, during a transmit mode, a first set of signals associated with one or more pixels of a pixel array using at least one electrode of a set of electrodes. The operations of 505 may be performed according to the methods described herein. In some examples, aspects of the operations of 505 may be performed by a sensor manager as described with reference to FIG. 4.

At 510, the device may sense, during a receive mode, a second set of signals associated with the one or more pixels of the pixel array using the at least one electrode. The operations of 510 may be performed according to the methods described herein. In some examples, aspects of the operations of 510 may be performed by a sensor manager as described with reference to FIG. 4.

At 515, the device may reduce, a background signal associated with the ultrasonic imaging sensor based on the sensing of the first set of signals and the second set of signals. The operations of 515 may be performed according to the methods described herein. In some examples, aspects of the operations of 515 may be performed by a sensor manager as described with reference to FIG. 4.

Figure 6:
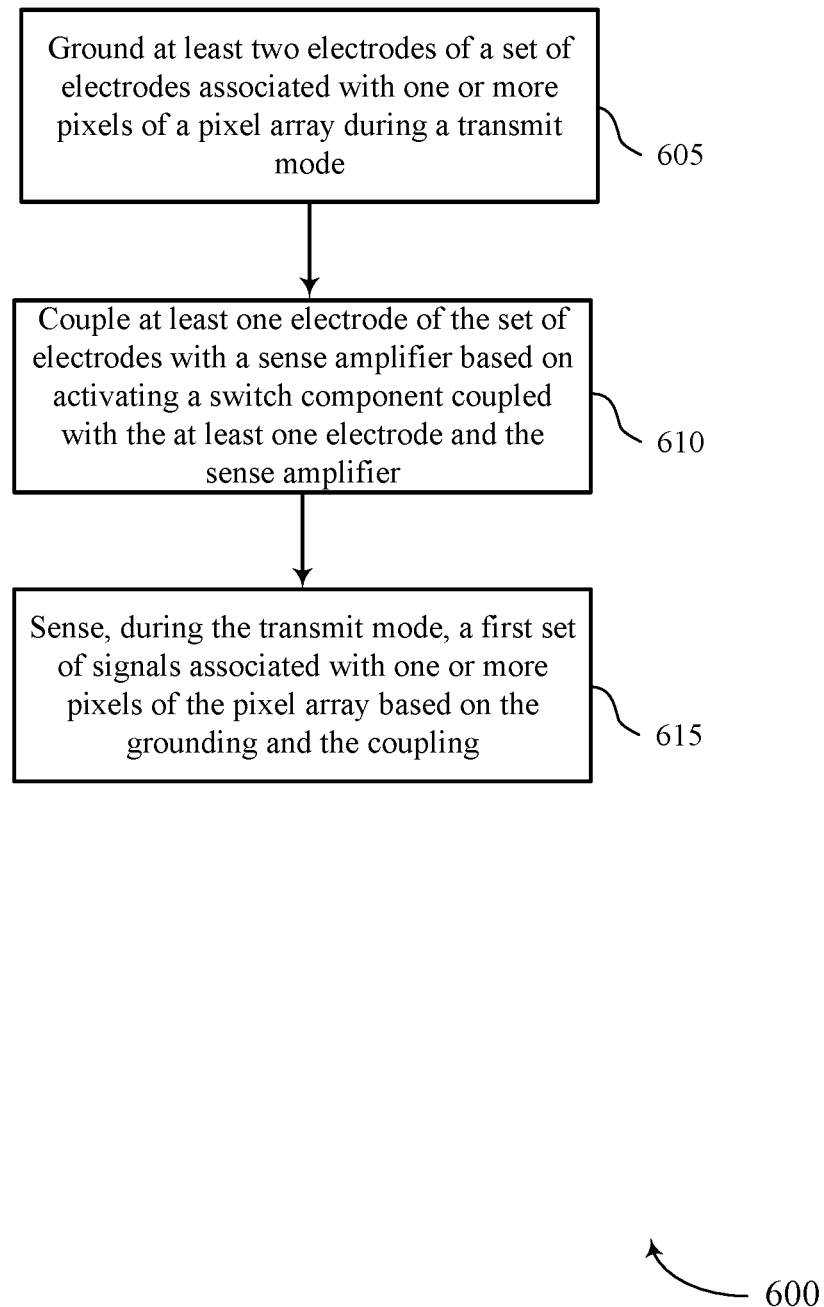

FIG. 6 shows a flowchart illustrating a method 600 that supports reducing background signal in imaging sensors in accordance with aspects of the present disclosure. The operations of method 600 may be implemented by a device or its components as described herein. For example, the operations of method 600 may be performed by a sensor manager as described with reference to FIG. 4. The device may include an ultrasonic imaging sensor configured to determine ridges and valleys of a fingerprint. The ultrasonic imaging sensor may include a pixel array with each pixel of the pixel array including a set of electrodes having at least three electrodes. For example, the ultrasonic imaging sensor may include a 3-port PMUT. In some examples, a device may execute a set of instructions to control the functional components of the device to perform the functions described below. Additionally, or alternatively, a device may perform aspects of the functions described below using special-purpose hardware.

At 605, the device may ground at least two electrodes of a set of electrodes associated with one or more pixels of a pixel array during a transmit mode. The operations of 605 may be performed according to the methods described herein. In some examples, aspects of the operations of 605 may be performed by a sensor manager as described with reference to FIG. 4.

At 610, the device may couple at least one electrode of the set of electrodes with a sense amplifier based on activating a switch component coupled with the at least one electrode and the sense amplifier. The operations of 610 may be performed according to the methods described herein. In some examples, aspects of the operations of 610 may be performed by a sensor manager as described with reference to FIG. 4.

At 615, the device may sense, during the transmit mode, a first set of signals associated with one or more pixels of the pixel array based on the grounding and the coupling. The operations of 615 may be performed according to the methods described herein. In some examples, aspects of the operations of 615 may be performed by a sensor manager as described with reference to FIG. 4.

Figure 7:
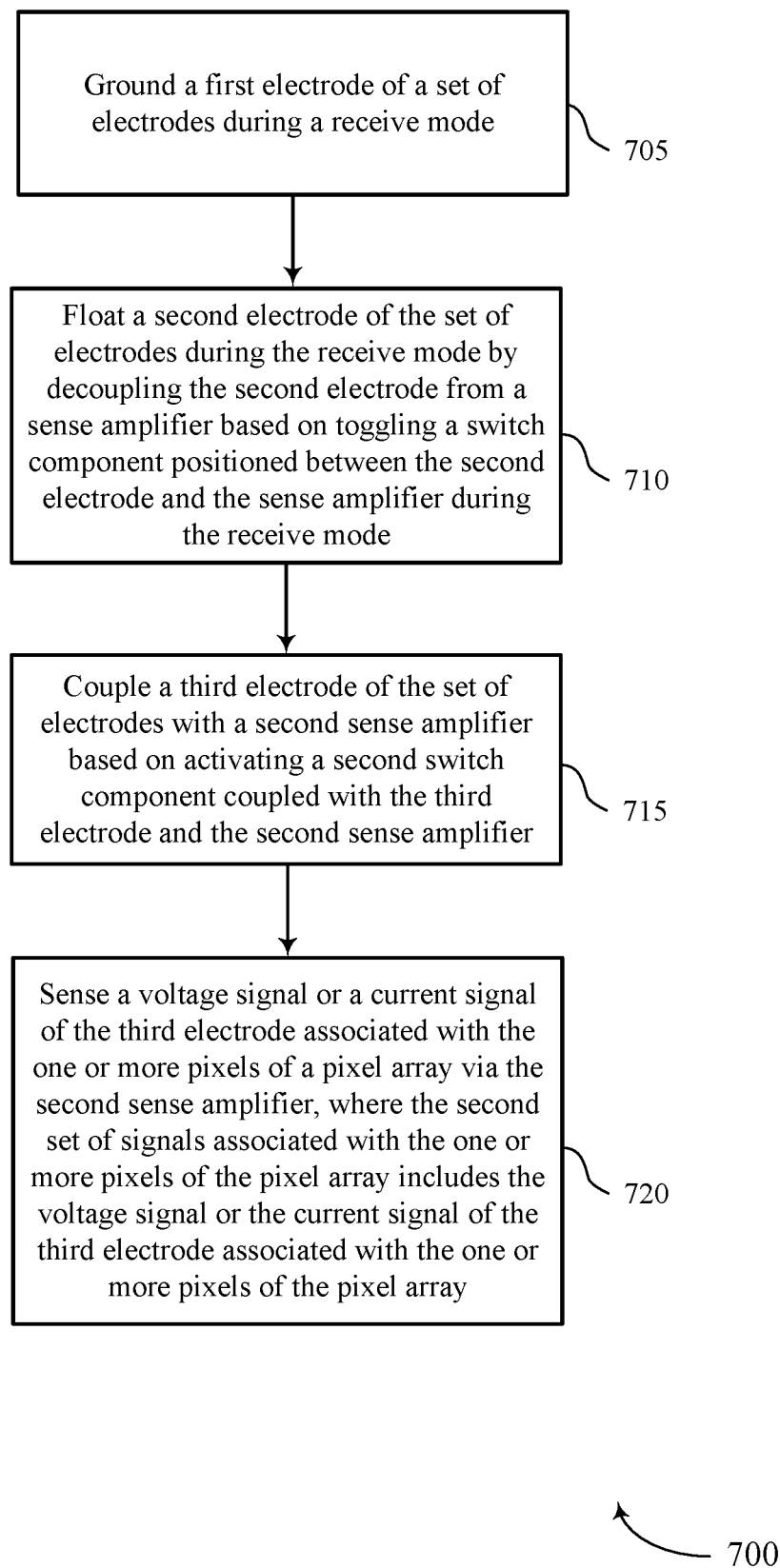

FIG. 7 shows a flowchart illustrating a method 700 that supports reducing background signal in imaging sensors in accordance with aspects of the present disclosure. The operations of method 700 may be implemented by a device or its components as described herein. For example, the operations of method 700 may be performed by a sensor manager as described with reference to FIG. 4. The device may include an ultrasonic imaging sensor configured to determine ridges and valleys of a fingerprint. The ultrasonic imaging sensor may include a pixel array with each pixel of the pixel array including a set of electrodes having at least three electrodes. For example, the ultrasonic imaging sensor may include a 3-port PMUT. In some examples, a device may execute a set of instructions to control the functional components of the device to perform the functions described below. Additionally, or alternatively, a device may perform aspects of the functions described below using special-purpose hardware.

At 705, the device may ground a first electrode of a set of electrodes during a receive mode. The operations of 705 may be performed according to the methods described herein. In some examples, aspects of the operations of 705 may be performed by a sensor manager as described with reference to FIG. 4.

At 710, the device may float a second electrode of the set of electrodes during the receive mode by decoupling the second electrode from a sense amplifier based on toggling a switch component positioned between the second electrode and the sense amplifier during the receive mode. The operations of 710 may be performed according to the methods described herein. In some examples, aspects of the operations of 710 may be performed by a transmission delay manager as described with reference to FIG. 4.

At 715, the device may couple a third electrode of the set of electrodes with a second sense amplifier based on activating a second switch component coupled with the third electrode and the second sense amplifier. The operations of 715 may be performed according to the methods described herein. In some examples, aspects of the operations of 715 may be performed by a sensor manager as described with reference to FIG. 4.

At 720, the device may sense a voltage signal or a current signal of the third electrode associated with the one or more pixels of a pixel array via the second sense amplifier, where the second set of signals associated with the one or more pixels of the pixel array includes the voltage signal or the current signal of the third electrode associated with the one or more pixels of the pixel array. The operations of 720 may be performed according to the methods described herein. In some examples, aspects of the operations of 720 may be performed by a sensor manager as described with reference to FIG. 4.

It should be noted that the methods described herein describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus comprising:
   a processor;
   memory in electronic communication with the processor;
   an ultrasonic imaging sensor coupled with the processor and the memory and configured to determine ridges and valleys of a fingerprint, the ultrasonic imaging sensor comprising a pixel array with each pixel of the pixel array comprising a set of electrodes having at least three electrodes; and
   instructions stored in the memory and executable by the processor to cause the apparatus to:
      sense, during a transmit mode, a first set of signals associated with one or more pixels of the pixel array using at least one electrode of the set of electrodes;
      ground at least two electrodes of the set of electrodes associated with the one or more pixels of the pixel array during the transmit mode;
      sense, during a receive mode, a second set of signals associated with the one or more pixels of the pixel array using the at least one electrode; and
      reduce a background signal associated with the ultrasonic imaging sensor based at least in part on the sensing of the first set of signals and the second set of signals.

2. The apparatus of claim 1, wherein the instructions are further executable by the processor to cause the apparatus to:
   determine a difference in amplitudes between the ridges and the valleys associated with the fingerprint based at least in part on the first set of signals and the second set of signals; and
   output a representation of the fingerprint using an image processing technique on the first set of signals and the second set of signals.

3. The apparatus of claim 1, wherein the at least two electrodes of the set of electrodes are in contact with an upper surface of a piezoelectric layer of a piezoelectric micromechanical ultrasonic transducer and the piezoelectric layer is uni-poled, the ultrasonic imaging sensor comprising the piezoelectric micromechanical ultrasonic transducer.

4. The apparatus of claim 1, wherein the instructions are further executable by the processor to cause the apparatus to:

couple the at least one electrode of the set of electrodes with a sense amplifier based at least in part on activating a switch component coupled with the at least one electrode and the sense amplifier.

5. The apparatus of claim 4, wherein the at least one electrode is in contact with a lower surface of a piezoelectric layer of a piezoelectric micromechanical ultrasonic transducer and the piezoelectric layer is uni-poled, the ultrasonic imaging sensor comprising the piezoelectric micromechanical ultrasonic transducer.

6. The apparatus of claim 1, wherein the instructions to sense, during the transmit mode, the first set of signals associated with the one or more pixels of the pixel array are further executable by the processor to cause the apparatus to:
sense a voltage signal or a current signal of the at least one electrode of the set of electrodes via a sense amplifier, wherein the first set of signals associated with the one or more pixels of the pixel array comprises the voltage signal or the current signal of the at least one electrode.

7. The apparatus of claim 6, wherein the instructions are further executable by the processor to cause the apparatus to:
short the at least one electrode by clamping the voltage signal or the current signal of the at least one electrode to ground during the receive mode.

8. The apparatus of claim 6, wherein the instructions are further executable by the processor to cause the apparatus to:
decouple the at least one electrode of the set of electrodes from the sense amplifier based at least in part on activating a switch component coupled with the at least one electrode and the sense amplifier during the receive mode.

9. The apparatus of claim 1, wherein the instructions are further executable by the processor to cause the apparatus to:
ground a first electrode of the set of electrodes during the receive mode.

10. The apparatus of claim 9, wherein the instructions to sense, during the receive mode, the second set of signals associated with the one or more pixels of the pixel array are further executable by the processor to cause the apparatus to:
float a second electrode of the set of electrodes during the receive mode by decoupling the second electrode from a sense amplifier based at least in part on toggling a switch component positioned between the second electrode and the sense amplifier during the receive mode.

11. The apparatus of claim 10, wherein the first electrode is in contact with an upper surface of a piezoelectric layer of a piezoelectric micromechanical ultrasonic transducer, and the second electrode is in contact with a lower surface of the piezoelectric layer of the piezoelectric micromechanical ultrasonic transducer, the ultrasonic imaging sensor comprising the piezoelectric micromechanical ultrasonic transducer.

12. The apparatus of claim 10, wherein the instructions are further executable by the processor to cause the apparatus to:
couple a third electrode of the set of electrodes with a second sense amplifier based at least in part on activating a second switch component coupled with the third electrode and the second sense amplifier,
wherein the at least one electrode comprises the third electrode.

13. The apparatus of claim 12, wherein the instructions to sense, during the receive mode, the second set of signals associated with the one or more pixels of the pixel array are further executable by the processor to cause the apparatus to:
sense a voltage signal or a current signal of the third electrode associated with the one or more pixels of the pixel array via the second sense amplifier,
wherein the second set of signals associated with the one or more pixels of the pixel array comprises the voltage signal or the current signal of the third electrode associated with the one or more pixels of the pixel array.

14. The apparatus of claim 1, wherein a first electrode of the set of electrodes associated with the one or more pixels of the pixel array is grounded during the transmit mode and the receive mode.

15. A method for reducing background signals at a device comprising an ultrasonic imaging sensor configured to determine ridges and valleys of a fingerprint, the ultrasonic imaging sensor comprising a pixel array with each pixel of the pixel array comprising a set of electrodes having at least three electrodes, the method comprising:
sensing, during a transmit mode, a first set of signals associated with one or more pixels of the pixel array using at least one electrode of the set of electrodes;
grounding at least two electrodes of the set of electrodes associated with the one or more pixels of the pixel array during the transmit mode;
sensing, during a receive mode, a second set of signals associated with the one or more pixels of the pixel array using the at least one electrode; and
reducing a background signal associated with the ultrasonic imaging sensor based at least in part on the sensing of the first set of signals and the second set of signals.

16. The method of claim 15, further comprising:
determining a difference in amplitudes between the ridges and the valleys associated with the fingerprint based at least in part on the first set of signals and the second set of signals; and
outputting a representation of the fingerprint using an image processing technique on the first set of signals and the second set of signals.

17. The method of claim 15, wherein the at least two electrodes of the set of electrodes are in contact with an upper surface of a piezoelectric layer of a piezoelectric micromechanical ultrasonic transducer and the piezoelectric layer is uni-poled, the ultrasonic imaging sensor comprising the piezoelectric micromechanical ultrasonic transducer.

18. An apparatus comprising an ultrasonic imaging sensor configured to determine ridges and valleys of a fingerprint, the ultrasonic imaging sensor comprising a pixel array with each pixel of the pixel array comprising a set of electrodes having at least three electrodes, the apparatus comprising:
means for sensing, during a transmit mode, a first set of signals associated with one or more pixels of the pixel array using at least one electrode of the set of electrodes;
means for grounding at least two electrodes of the set of electrodes associated with the one or more pixels of the pixel array during the transmit mode;
means for sensing, during a receive mode, a second set of signals associated with the one or more pixels of the pixel array using the at least one electrode; and
means for reducing a background signal associated with the ultrasonic imaging sensor based at least in part on the sensing of the first set of signals and the second set of signals.

* * * * *